US012261395B2

(12) United States Patent
Schmidt et al.

(10) Patent No.: US 12,261,395 B2
(45) Date of Patent: Mar. 25, 2025

(54) ELECTRICAL CONNECTOR SYSTEM WITH MINIATURIZED CONNECTOR POSITION ASSURANCE MEMBER

(71) Applicant: Aptiv Technologies Limited, Schaffhausen (CH)

(72) Inventors: Rainer Schmidt, Nuremberg (DE); Paul Wohlfahrt, Mömbris (DE); Bruno Barth, Fürth (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 402 days.

(21) Appl. No.: 17/685,789

(22) Filed: Mar. 3, 2022

(65) Prior Publication Data

US 2022/0285881 A1 Sep. 8, 2022

(30) Foreign Application Priority Data

Mar. 3, 2021 (DE) ......................... 202021000826.8
Mar. 7, 2021 (DE) ......................... 202021001699.6

(51) Int. Cl.
*H01R 13/629* (2006.01)
*H01R 13/502* (2006.01)
*H01R 13/627* (2006.01)
*H01R 13/639* (2006.01)

(52) U.S. Cl.
CPC ..... *H01R 13/62955* (2013.01); *H01R 13/502* (2013.01); *H01R 13/6272* (2013.01); *H01R 13/639* (2013.01)

(58) Field of Classification Search
CPC ............ H01R 13/62955; H01R 13/502; H01R 13/6272; H01R 13/639
See application file for complete search history.

(56) References Cited

U.S. PATENT DOCUMENTS 7,909,638 B2 * 3/2011 Seo .................... H01R 13/6272 439/352
9,425,534 B2 * 8/2016 Schmidt ............. H01R 13/6272
9,490,574 B2 * 11/2016 Kon ..................... H01R 13/639
(Continued)

FOREIGN PATENT DOCUMENTS

WO 2015142686 A1 9/2015
WO 2016173971 A1 11/2016
(Continued)

*Primary Examiner* — Thanh Tam T Le
(74) *Attorney, Agent, or Firm* — Billion & Armitage

(57) ABSTRACT

An electrical connector system includes a plug connector and a secondary locking device. The plug connector mates with a corresponding counter connector and includes a plug connector housing having a terminal cavity for receiving an electrical contact terminal. The secondary locking device provides a secondary locking function when the plug connector mates with the corresponding counter connector and when the secondary locking device is in a closed position. The secondary locking device is movable relative to the plug connector housing from an open position to the closed position. The secondary locking device has a stem portion and a flexible leg. The stem portion extends in the closing direction. The flexible leg has a fixed end and a free end. The flexible leg connects to the stem portion at its fixed end. The flexible leg extends from the fixed end to the free end opposite the closing direction.

9 Claims, 9 Drawing Sheets

(56) References Cited

U.S. PATENT DOCUMENTS

| | | | | |
|---|---|---|---|---|
| 9,577,382 | B2 * | 2/2017 | Kida | H01R 13/639 |
| 9,979,131 | B2 * | 5/2018 | Venkatesan | H01R 13/6272 |
| 10,109,953 | B2 * | 10/2018 | Schmidt | H01R 13/6272 |
| 10,116,091 | B2 * | 10/2018 | Salgado | H01R 13/62927 |
| 10,276,980 | B2 * | 4/2019 | Benichou | H01R 13/245 |
| 10,855,025 | B2 * | 12/2020 | Holub | H01R 13/641 |
| 11,114,799 | B2 * | 9/2021 | Schoedel | H01R 13/502 |
| 11,165,198 | B2 * | 11/2021 | Masuda | H01R 13/502 |
| 11,217,938 | B2 * | 1/2022 | Narama | H01R 13/28 |
| 2017/0271814 | A1 | 9/2017 | Salgado et al. | |
| 2017/0317448 | A1 | 11/2017 | Benichou et al. | |
| 2018/0062314 | A1 | 3/2018 | Schmidt | |
| 2018/0316132 | A1 | 11/2018 | Holub et al. | |

FOREIGN PATENT DOCUMENTS

| | | | |
|---|---|---|---|
| WO | 2017144660 | A1 | 8/2017 |
| WO | 2020183255 | A1 | 9/2020 |

* cited by examiner

ELECTRICAL CONNECTOR SYSTEM WITH MINIATURIZED CONNECTOR POSITION ASSURANCE MEMBER

CROSS-REFERENCE TO RELATED APPLICATION

This application claims benefit of priority to German Utility Model (Gebrauchsmuster) Application No. 20 2021 000 826.8 filed on Mar. 3, 2021, and German Utility Model Application No. 20 2021 001 699.6 filed on May 7, 2021, the entire disclosure of each of which is hereby incorporated by reference.

TECHNICAL FIELD

The present disclosure relates generally to a secondary locking device, to an electrical connector system and to a connector assembly and to a method for mating the electrical connector system.

BACKGROUND

Electrical connector systems including a plug connector and a secondary locking device are known in the art. For example, plug connectors having a plug connector housing including at least one terminal cavity are known for electrical connections used e.g., in vehicles. These terminal cavities may be sized and shaped to receive a terminal of a 0.5 mm terminal system.

Such electrical connectors are becoming smaller and smaller. However, there is a limit to miniaturize these connectors as they must remain robust, easy to manufacture and easy to handle.

Further, known secondary locking devices typically include at least one flexible leg, having for example a locking means provided thereon, wherein the flexible legs protrude in a mating direction. Those flexible legs are prone to getting damaged. For example, the flexible legs can get jammed or caught prior or during pre-assembling the secondary locking device with the plug connector. Particularly, if stored or transported as bulk, the flexible legs of know secondary locking devices are prone to jamming and catching, resulting in prolonged sorting times of the bulk prior assembly or even damages. Further, known flexible legs are prone to cable catching prior or during pre-assembling the secondary locking device.

Still further, known secondary locking devices typically have a very complex geometry. Thus, complicated injection molds are required, prolonging cycle times and manufacturing costs.

SUMMARY

It is the aim of the present disclosure to provide an electrical connector system that is robust, simple, and easy to manufacture.

In particular, this objective is achieved by a secondary locking device, by an electrical connector system including the secondary locking device and by a connector assembly, including the electrical connector system.

The electrical connector system according to the present disclosure includes a plug connector and a secondary locking device. The secondary locking device is also in the art known as a connector positioning assurance member (CPA).

The plug connector is configured to be mated with the corresponding counter connector and includes a plug connector housing having at least one terminal cavity for receiving at least one electrical contact terminal. Further, the plug connector housing may include multiple (at least two) terminal cavities, each cavity may receive at least one electrical contact terminal. The terminal cavities may be arranged in rows and/or columns and may be configured to receive electrical contact terminals of e.g., a 0.5 mm terminal system.

The secondary locking device is configured to provide a secondary locking function when the plug connector is mated with the corresponding counter connector and when the secondary locking device is in a closed position. Thus, the plug connector can be securely held in the mated condition with the corresponding counter connector, i.e., in its mating position. Thus, unintentional loosening of the plug connector and the corresponding counter connector can be prevented, and a reliable electrical contact can be ensured, even under harsh environmental circumstances, such as vibration, shock and/or the like.

Further, the secondary locking device is arranged moveable relative to the plug connector housing to be moveable from an open position to the closed position along a closing direction C. When the secondary locking device is in its open position, the plug connector can be mated with the counter connector. When the secondary locking device is in its closed position, the secondary locking function is provided, and the plug connector is securely held in the mated condition.

The secondary locking device has a stem portion and at least one flexible leg, wherein the stem portion extends substantially in closing direction C. The flexible leg has a fixed end and a free end, wherein the flexible leg is connected to the stem portion at its fixed end, and wherein the flexible leg extends from the fixed end to the free end in a direction against the closing direction C.

In other words, the flexible leg does not protrude in closing direction and thus, a front end of the secondary locking device (i.e., the end of the secondary locking device facing in closing direction) is more closed. Therefore, the secondary locking device is less prone to jamming, catching and cable catching, resulting in reduced sorting times and a reduced risk of damaging the secondary locking device. The section of the secondary locking device, where the flexible leg is connected to the stem portion at its fixed end may be formed in a curved shape (particularly C-shaped, or U-shaped). By choosing the curvature radius, the flexibility of the flexible leg can be configured.

Further, the more closed design of the front end of the secondary locking device, especially if provided in C-shape or U-shape, prevents jamming of the secondary locking devices, e.g., if provided as bulk, prior to getting assembled with the plug connector. This improves manual and automated assembly, as sorting of the secondary locking devices can be speeded up. Further, the risk of damaging the secondary locking devices during sorting and assembling is reduced. Besides jamming, the more closed design of the front end of the secondary locking device effectively prevents undesired cable catching, e.g., during cable harness manufacturing or during assembly of the electrical connector system.

Further, when the flexible leg of the secondary locking device is in an unflexed condition, a distance between the free end of the flexible leg and the stem portion may be less than the minimum wall thickness of the secondary locking device. Thus, catching and jamming of secondary locking devices can be effectively prevented, particularly if the secondary locking devices are stored and/or transported, for example as bulk goods. Further, as catching and jamming is prevented, sorting times prior to assembling the secondary locking devices can be significantly reduced.

Further, the secondary locking device may include a pushing plate that provides a pushing face for pushing the secondary locking device in a mating direction. The stem portion of the secondary locking device may extend from a lower surface of the pushing plate that is opposite to the pushing face. A distance between a tip of the flexible leg and the lower surface of the pushing plate may be chosen so that the lower surface abuts with the tip of the free end of the flexible leg, when the secondary locking device is pushed in mating direction when being in its open state. Thus, the flexible leg is stabilized, when the secondary locking device is pushed in mating direction when being in its open state. This allows to provide an increased blocking force, i.e., the force required to move the secondary locking device out of the open position.

Further, a tip abutment means may protrude from the lower surface of the pushing plate. The tip abutment means may be configured to abut with a tip of the free end of the flexible leg, so as to limit a movement of the free end in a direction against the mating direction, when the secondary locking device is pushed in mating direction when being in its open state. Providing a tip abutment means allows a further stabilization of the flexible leg and hence to increase the blocking force even further.

The tip abutment means may be sized and shaped so that the tip of the free end of the flexible leg can pass by in case there is no pushing force provided on the pushing face. Thus, the secondary locking means and particularly the flexible leg can be easily unlocked. In case there is a pushing force, and the secondary locking device is in its open position, the tip abutment means may stabilize the flexible leg by abutting the tip of the free end of the latter.

Further, the secondary locking device may include an anti-catch protrusion. The anti-catch protrusion protrudes laterally from the free end of the flexible leg towards the stem portion. The lateral direction, i.e., the protruding direction of the anti-catch protrusion may be substantially perpendicular to a flex-direction (secondary flex direction F2) of the flexible leg. Still further, the anti-catch protrusion may protrude from a surface of the flexible leg that is opposite to a surface of the flexible leg, where an abutment means may protrude from the flexible leg. Thus, the abutment means may protrude from the flexible leg in an opposite direction than the anti-catch protrusion. With providing an anti-catch protrusion, a width of a gap between the free end of the flexible leg and the stem portion can be further reduced. Thus, catching and jamming of the secondary locking device with cables, further secondary locking devices and/or the like can be prevented. The anti-catch protrusion may further be sized and shaped so as to limit a movement of the flexible leg in a direction towards the stem portion. The allowable movement towards the stem portion can be adjusted by providing a defined gap between the anti-catch protrusion at the free end of the flexible leg and the stem portion. Thus, a movement of the flexible leg in a direction towards the stem portion can be blocked upon abutment between the stem portion and the anti-catch protrusion. It is to be understood, that in an alternative embodiment, the anti-catch protrusion can be provided on the stem portion, protruding towards the free end of the flexible leg. Limiting the movement of the flexible leg in a direction towards the stem portion allows to provide a lateral stabilization of the flexible leg and therefore an increased blocking force.

Further, the flexible leg, particularly the free end of the flexible leg, may include an anti-catch surface, facing in a direction opposite to the secondary flex direction. When seen from the lateral direction, a root portion of the stem portion and the anti-catch surface of the flexible leg, particularly the free end of the flexible leg may form a combined contour that is continuously shaped. Particularly, the combined contour may describe a steady contour and/or a contour being a differentiable function. Thus, a smooth geometry can be provided that prevents cable catching and/or catching of further secondary locking devices and/or the like.

Further, the flexible leg may have a thinner wall thickness than the stem portion. Thus, when flexing the flexible leg, the stem portion may remain substantially unflexed. Particularly, the wall thickness of the flexible leg in a direction perpendicular to the closing direction and optionally perpendicular to the secondary flex direction, may be smaller than a wall thickness of the stem portion in the direction, thereby allowing the flexible leg to slide by a contact pin of a corresponding counter connector, when the plug connector is mated with the corresponding counter connector and the secondary locking device is in its closed position. Further, the stem portion may be designed so as to cover at least partially (but not contact) the respective contact pin(s), when seen from a top view and when the plug connector is mated with the corresponding counter connector and the secondary locking device is in its closed position. Thus, the secondary locking device does not disturb or damage existing contact pins and can, for example, be used in standardized and well-established connector systems respectively in connector systems that shall be mated in standardized and well-established corresponding counter connectors. Further, in case the flexible leg slides by the contact pin(s), there is no need to remove the contact pins, for using the secondary locking device.

Further, the design of the secondary locking device may allow to provide a simplified injection mold, as the flexible leg can be integrally formed with the stem portion. In particular, the secondary locking device may be shaped and designed so as to be manufacturable with a 1-way tool. Particularly, the secondary locking device may be designed and shaped, that a mold parting surface may be provided between the free end of the flexible leg and the stem portion during injection molding and that due to shrinking, the distance between the free end of the flexible leg and the stem portion may be less than the minimum wall thickness of the secondary locking device, after the secondary locking device is removed from the mold. Even further, shrinking may be designed so as the free end of the flexible leg substantially lies against the stem portion after the secondary locking device being removed from the mold.

Further, the stem portion may include a flexible beam, extending from the pushing plate to a distal end of the stem portion, wherein the flexible beam may include a first end and a second end and wherein the first end and the second end are fixed ends. The flexible beam optionally further includes a beam locking protrusion, wherein the beam locking protrusion can be configured to engage with a corresponding beam locking protrusion of the plug connector when the secondary locking device is in its closed state. Hence, a further locking of the secondary locking device can be provided. Further, the engagement of the beam locking protrusion with a corresponding beam locking protrusion can provide an acoustic and/or haptic feedback of a proper engagement. The position of the beam locking protrusion on the flexible beam may be chosen so as to prevent a contact between the beam locking protrusion and the corresponding beam locking protrusion, as long as the secondary locking device is in its open position. Thus, even when being (unintentionally) pushed in a mating direction in its open position, the flexible beam does not deform and a proper function of the flexible beam can be guaranteed, when the secondary locking device is intentionally moved to the closed position.

The stem portion and in particular the flexible beam may include at least one leg stabilization means in form of protrusion or recess. The flexible leg may include at least one corresponding leg stabilization means facing the leg stabilization means of the stem portion. The leg stabilization means and the corresponding leg stabilization means are configured to contact each other, so as to limit a torsional movement of the flexible leg that may occur during movement of the secondary locking device relative to the plug connector housing. Hence, a smooth movement of the secondary locking device from the open to the closed position (and vice versa) can be achieved and jamming due to undesired torsional movements of the flexile leg can be prevented.

Further, the plug connector housing may have a flexible arm arranged in a sidewall of the plug connector housing. This allows the connector housing easier to mold. Further, as the flexible arm is arranged in a sidewall of the plug connector housing, the connector housing shields the flexible arm at least partially and protects the flexible arm from getting damaged. Thus, the connector housing is more robust.

The flexible arm may have a primary locking means configured to provide a primary locking function when the plug connector is in a mated position with a corresponding counter connector. Thus, the plug connector is held in the corresponding counter connector and prevented from getting unmated. The flexible arm of the plug connector housing may be configured to flex in a direction towards the secondary locking device (primary flex direction F1) and the primary locking means (particularly a respective protrusion) may protrude in a direction opposite the primary flex direction F1.

Optionally the primary locking means includes a protrusion wherein the protrusion is configured to cooperate with a primary opening or recess in the counter connector. Further optionally, the primary opening or recess is arranged in a sidewall of the counter connector.

Providing an opening in the counter connector that receives the protrusion of the primary locking means allows for a more compact and robust counter connector design. Preferably, the counter connector is free from protrusions for a primary locking function. Instead, the counter connector includes openings to receive the protrusions for the primary locking function. Further, those openings are easy to manufacture, e.g., by injection molding.

Further the protrusion of the primary locking means may include a locking face that is configured to contact and engage a rim portion of the opening of recess provided in the counter connector for the primary locking function. Further, the protrusion of the primary locking means may include a sloping ramp surface for bending the flexible arm with a sidewall of the counter connector. Thus, the flexible arm is flexed out of a rest condition (i.e., a condition wherein there is no flexing) into a flexed condition, when the plug connector is moved from its initial position to a mated position along a mating direction A, without the need of manually flexing the flexible arm. When the plug connector has reached the mated position, the flexible arm is configured to flex back into a rest position and the primary locking means, particularly the protrusion thereof, can cooperate with the primary opening or recess in the counter connector to provide the primary locking function.

Further, the secondary locking device may include a blocking means to provide a secondary locking function. The blocking means is configured to block the flexible arm of the plug connector in a rest condition, thereby preventing the flexible arm from releasing the primary locking means, when the secondary locking device is in its closed position.

For example, the flexible arm may include a free end and the blocking means may be configured to engage with the free end of the flexible arm, thereby preventing the flexible arm from getting flexed. Thus, the flexible arm is held in the rest condition and a secondary locking function can be provided.

For example, the free end of the flexible arm may protrude over an end portion of the plug connector housing in a direction opposite the mating direction. Particularly, the free end of the flexible arm may protrude through a top opening in the plug connector housing. In other words, the free end of the flexible arm may be arranged exterior to the plug connector housing. This free end can then engage with the blocking means of the secondary locking device so as to provide the secondary locking function when the secondary locking device is in its closed position. Further, arranging the free end of the flexible arm exterior to the plug connector housing enables a user to easily operate the flexible arm if necessary. For example, the user may flex the flexible arm directly and manually without the plug connector housing being in the way, for unlocking and un-mating the plug connector, after the secondary locking device has been moved to its open position or was removed.

Further, the flexible arm may protrude over a pushing plate of the secondary locking device in a direction opposite the closing direction in case the secondary locking device is in its closed position. Thus, when moving the secondary locking device from the open position to the closed position, the user will get tactile feedback by the protruding free end of the flexible arm, when the secondary locking device has reached its closed position.

In a further aspect, the flexible leg may include a locking means configured to provide a further locking function when the plug connector is in the mated position with the corresponding counter connector. Thus, the mating between the plug connector and the counter connector can be further secured.

Optionally the locking means includes a protrusion, wherein the protrusion is configured to cooperate with a secondary opening (or recess) in the counter connector, wherein further optionally the primary and secondary openings (or recesses) are arranged in a common sidewall of the counter connector. Even further the primary and secondary openings (or recesses) may be integrally formed as one opening/recess.

Providing an opening in the counter connector that receives the protrusion of the further locking means allows for a more compact and robust counter connector design. Preferably, the counter connector is free from protrusions for a primary locking function and/or a further locking function. Instead, the counter connector includes openings to receive the protrusions for the primary locking function and/or the further locking function. Further, those openings are easy to manufacture, e.g., by injection molding.

The flexible leg of the secondary locking device is configured to flex in a direction towards the stem portion (secondary flex direction F2), and wherein the locking means may protrude in a direction opposite the secondary flex direction F2.

The plug connector housing may have an elongated first slot that is arranged in a sidewall of the plug connector housing. The locking means may be configured to protrude outwardly through the elongated first slot to cooperate with a secondary opening (or recess) in the counter connector. Providing an elongated first slot in a sidewall of the plug connector housing allows a compact and robust solution for the primary and further locking function.

The elongated first slot may be arranged adjacent to the flexible arm of the plug connector housing. The elongated first slot contributes to the flexibility of the flexible arm. In other words, the elongated first slot defines one longitudinal edge of the flexible arm. Even further, the plug connector housing may include an elongated second slot along the mating direction. This elongated second slot may be arranged adjacent to the flexible arm and contributes to the flexibility of the flexible arm. In other words, the elongated second slot defines another longitudinal edge of the flexible arm. Therefore, the flexible arm may be arranged between the elongated first- and second slot.

The locking means of the flexible leg, and in particular the respective protrusion, may include a sloping ramp surface for bending the flexible leg with a sidewall of the counter connector. Thus, the flexible leg is flexed out of a rest condition (i.e., a condition wherein there is no flexing) into a flexed condition, when the secondary locking device is moved from its open position to its closed position along a closing direction C, without the need of manually flexing the flexible leg. When the secondary locking device has reached the closed position, the flexible leg is configured to flex back into a rest position and the locking means, particularly the protrusion thereof, can cooperate with the secondary opening or recess in the counter connector to provide the further locking function. The secondary opening or recess may have a sharp edge that is configured to carve into a rearward sloping ramp surface of a protrusion of the locking means of the flexible leg. Thereby securing the secondary locking device is securely locked in the closed position.

Further, the plug connector housing may include a pre-blocking means configured to block the secondary locking device from moving from the open to the closed position when the plug connector is in an unmated position (or initial position) with the counter connector, wherein the flexible leg of the secondary locking device may include an abutment means configured to engage with the pre-blocking means for the blocking. Thus, closing the secondary locking device prior to having mated the plug connector can be prevented. In other words, a correct mating order is established, as first the plug connector has to be mated before the secondary locking device can get closed. This allows to reduce operating errors during plugging the plug connector. Particularly, the pre-blocking means may be configured to block the secondary locking device in a pre-locked, open position, as long the plug connector is not entirely mated to a corresponding counter connector. Thus, a worker is able to check visually and/or haptically the position of the secondary locking device (e.g., as it still protrudes from the plug connector housing) to check, whether the plug connector and the corresponding counter connector are properly mated. To support the visual feedback, the secondary locking device may be colored in a signal color.

The flexible leg of the secondary locking device may be configured to flex in a secondary flex direction F2 towards the stem portion, wherein the abutment means may protrude from the flexible leg, in particular from a free end of the flexible leg, in a direction substantially perpendicular to the secondary flex direction. Optionally, the abutment means is received in a corresponding additional locking recess provided in the plug connector housing, when the secondary locking device is in the closed position, so as to secure the secondary locking device in the closed position. Thus, the secondary locking device is securely held in the plug connector housing.

The abutment means may include an abutment face that is configured to contact the pre-blocking means of the plug connector housing for the blocking. Further, the abutment means may include a lock release face that is configured to engage with a corresponding lock release face provided on the plug connector housing, when the secondary locking device is moved from the closed position to the open position, so as to release the further locking function. The corresponding lock release face may be provided in additional locking recess provided in the plug connector housing. The lock release face may be designed so as to allow releasing the locking means of the flexible leg from the secondary opening or recess. Particularly, if the secondary opening or recess has a sharp edge that is configured to carve into a rearward sloping ramp surface of a protrusion of the locking means of the flexible leg, the lock release face facilitates releasing the secondary locking device so as to allow a movement from the closed to the pre-locked position.

The plug connector housing may include an elongated guiding means along the mating direction A and the secondary locking device may include a corresponding guiding means that is configured to couple with the elongated guiding means, so as to guide the movement of the secondary locking device from the open position to the closed position. The elongated guiding means of the plug connector housing may include an elongated groove and/or an elongated rib and the corresponding guiding means may include a complementary shaped elongated guiding means. Thus, a tilting and jamming of the secondary locking device can be prevented.

The flexible arm of the plug connector may include a fixed end and a free end, and the flexible arm may extend from its fixed end to its free end opposite to the mating direction A. The mating direction A corresponds to the direction of movement of the plug connector when it is moved from the unmated (initial) position to the mated position with the counter connector. This allows to provide a free end of the plug connector's flexible arm that is arranged exterior to the plug connector housing. Thus, manual actuation of the flexible arm and blocking the flexible arm via the secondary locking device to provide the secondary locking function is facilitated.

Still further, the mating direction A and the closing direction C may point in the same direction. Thus, the plug connector and the secondary locking device are moved in the same direction during mating and closing, respectively. These joint directions facilitate mating and closing of the plug connector and the secondary locking device, respectively. Preferably, mating and closing can be carried out with one common movement.

In the electrical connector system described above, when the flexible arm of the plug connector is in a rest condition and the flexible leg of the secondary locking device is in a flexed condition, the pre-blocking means and the abutment means may be configured to release the secondary locking device allowing it to move from the open position to the closed position and from moving from the closed position to an open position.

For example, when the flexible leg is in a flexed condition and the flexible arm is in a rest condition, the abutment means is moved away in a sideward direction from the pre-blocking means and an engagement between the abutment means and pre-blocking means is loosened. This releases the secondary locking device and allows it to move with respect to the plug connector housing from the open to the closed position. Respectively, an engagement between the abutment means and the additional locking recess is loosened and allows the secondary locking device to move with respect to the plug connector housing from the closed to the open position.

In the electrical connector system described above, when the flexible arm of the plug connector and the flexible leg of the secondary locking device are in a rest condition, the pre-blocking means and the abutment means are configured to block the secondary locking device from moving from the open position to the closed position, or vice versa.

Further, the pre-blocking means and the abutment means may be arranged and configured so that when the flexible arm of the plug connector and the flexible leg of the secondary locking device are in a flexed condition the pre-blocking means and the abutment means are configured to block the secondary locking device from moving from the open position to the closed position. This is advantageous as it allows a user to only push the secondary locking device in the mating direction for mating the plug connector with the counter connector.

The secondary locking device may include an engagement means, configured to engage with the plug connector housing, so as to prevent the secondary locking device from being decoupled from the plug connector housing, when the secondary locking device is in its open position. The engagement means may be provided as protrusion that engages with a corresponding recess or groove. With providing the engagement means, the secondary locking device can be securely coupled with the plug connector housing even when the plug connector is not mated. Thus, an unintentional loosening of the secondary locking device can be prevented.

The present disclosure further relates to a secondary locking device as such, for being used in an electrical connector system as described above. The secondary locking device according to the present disclosure may be configured, shaped, and designed as described above with respect to the electrical connector system. Particularly, the secondary locking device has a stem portion and at least one flexible leg, wherein the stem portion extends substantially in a closing direction C, and wherein the flexible leg has a fixed end and a free end, wherein the flexible leg is connected to the stem portion at its fixed end. The flexible leg extends from the fixed end to the free end in a direction against the closing direction C. The closing direction C is the direction in which the secondary locking device is moved relative to a plug connector housing, when being moved from an open position and a closed position.

In other words, the flexible leg does not protrude in closing direction and thus, a front end of the secondary locking device (i.e., the end of the secondary locking device facing in closing direction) is more closed. Therefore, the secondary locking device is less prone to jamming, catching and cable catching, resulting in reduced sorting times and a reduced risk of damaging the secondary locking device. Particularly, the more closed design of the front end of the secondary locking device prevents jamming of the secondary locking devices, e.g., if provided as bulk goods, prior to getting assembled with the plug connector. Further, the risk of damaging the secondary locking devices during sorting and assembling is reduced. Besides jamming, the more closed design of the front end of the secondary locking device effectively prevents undesired cable catching.

The disclosure further relates to a connector assembly including an electrical connector system as described above and a counter connector configured to receive the plug connector and the secondary locking device at least partly. The counter connector includes a counter connector housing having at least one sidewall, wherein the at least one side wall includes at least one of the following, a primary opening for receiving the primary locking means and/or a secondary opening for receiving the further locking means. The primary opening and the secondary opening are optionally separated openings, or integrally formed as one opening. The counter connector may be manufactured more easily when the primary opening and the secondary opening are formed in the same side wall.

Further, the connector assembly can be assembled (mated) according to the following method. The method including the following steps:

- providing an electrical electrical connector system, including a plug connector and a secondary locking device, as specified above.
- providing a counter connector,
- mating the plug connector with the counter connector by moving the plug connector from an initial (unmated) position to a mated position and
- providing a secondary locking function, by moving the secondary locking device with respect to the plug connector housing from an open position to a closed position.

BRIEF DESCRIPTION OF THE DRAWINGS

An electrical connector with a lever locking member and mate assist mechanism is now described, by way of example with reference to the accompanying drawings, in which.

DETAILED DESCRIPTION

Figure 1:
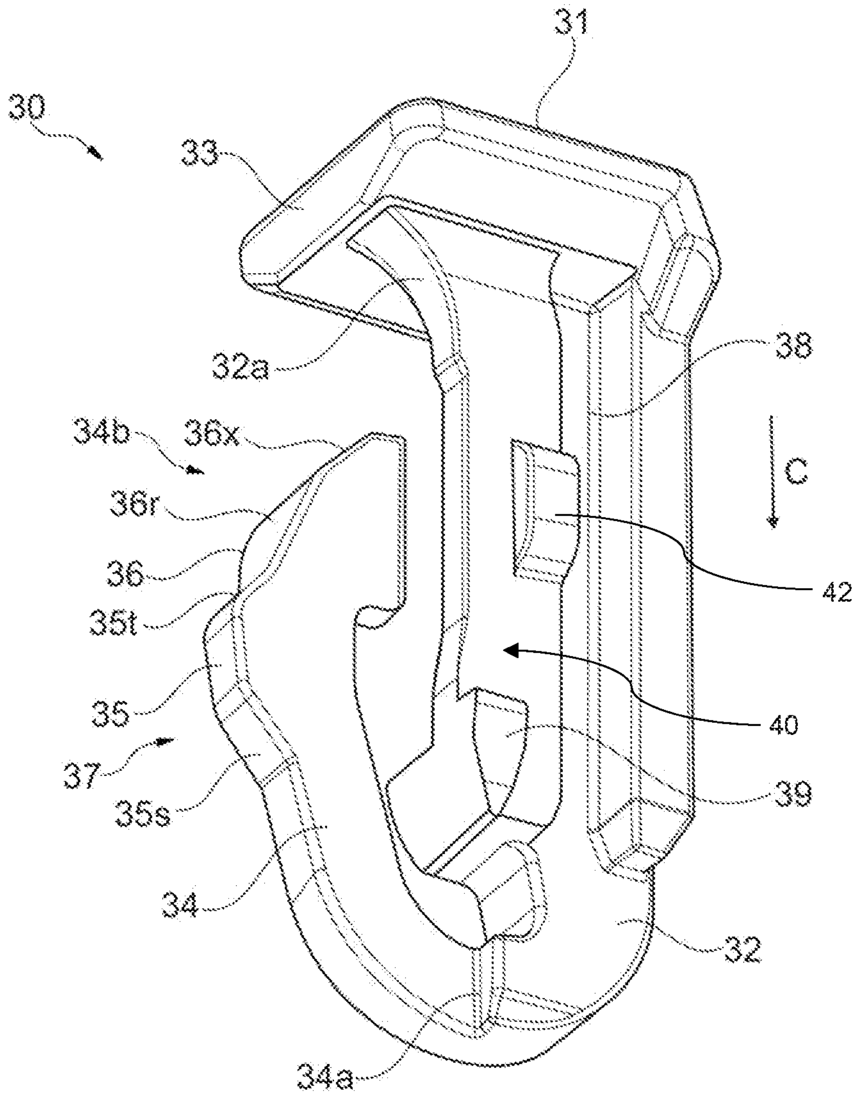
FIG. 1 shows a perspective view of a secondary locking device.
Figure 2:
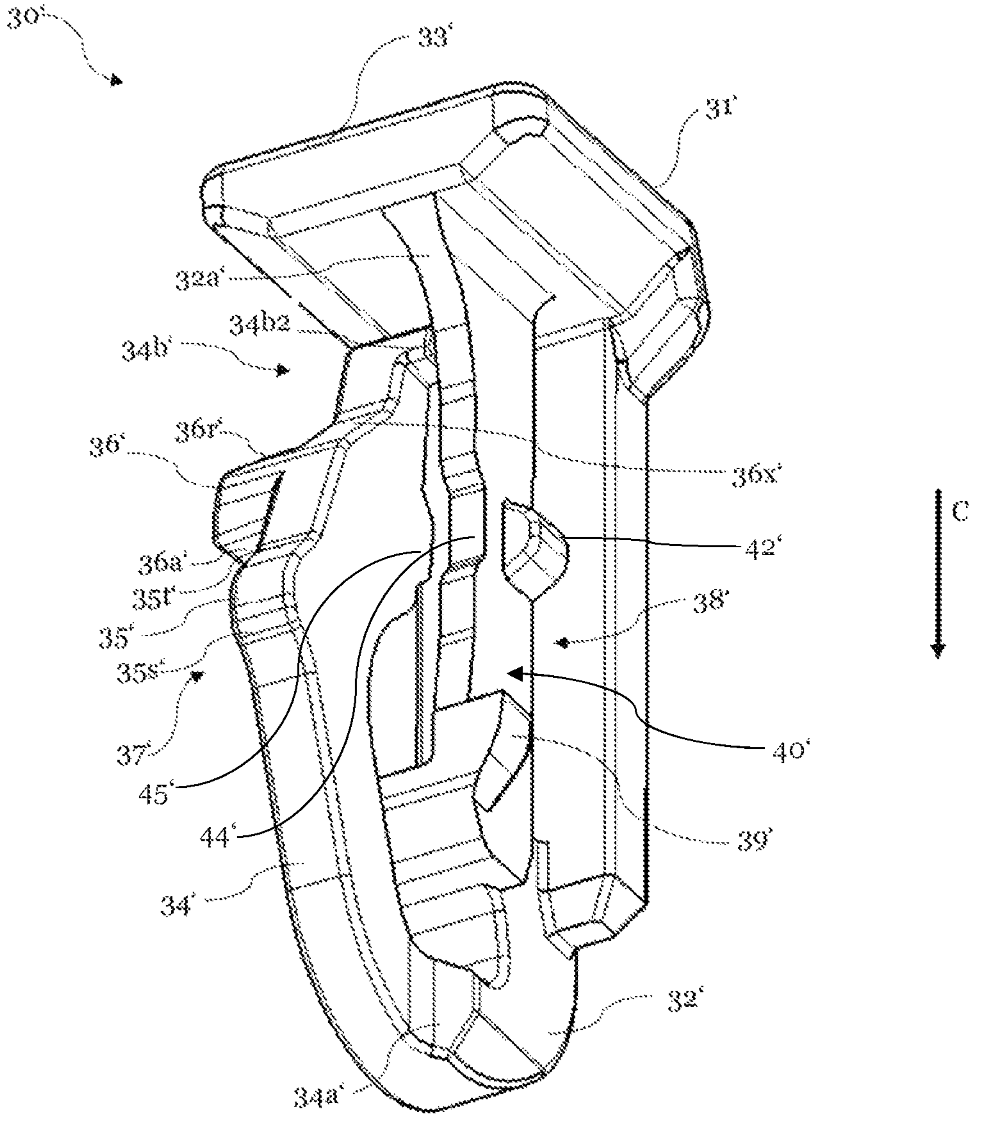
FIG. 2 shows a perspective view of a secondary locking device, according to a further embodiment.

FIG. 1 and FIG. 2 each show a perspective view of a secondary locking device 30, 30' for being used in an electrical connector system 1, as shown in FIGS. 6A to 6F. The secondary locking device 30, 30' has a stem portion 32, 32' and at least one flexible leg 34, 34' wherein the stem portion 32, 32' extends substantially in a closing direction C. The flexible leg 34, 34' has a fixed end 34*a*, 34*a*' and a free end 34*b*, 34*b*', wherein the flexible leg 34, 34' is connected to the stem portion 32, 32' at its fixed end 34*a*, 34*a*'. The flexible leg 34, 34' extends from the fixed end 34*a*, 34*a*' to the free end 34*b*, 34*b*' in a direction against the closing direction C. The closing direction C is the direction in which the secondary locking device 30, 30' is moved relative to a plug connector housing, when being moved from an open position and a closed position (cf. FIG. 6D).

The section of the secondary locking device 30, 30' where the flexible leg 34, 34' is connected to the stem portion 32, 32' at its fixed end 34*a*, 34*a*' is formed in a curved shape (particularly C-shaped, or U-shaped), wherein the curvature radius is chosen so as to provide a desired flexibility of the flexible leg. Further, the C-shape or U-shape, prevents jamming of the secondary locking devices 30, 30', e.g., if provided as bulk goods, prior to getting assembled with a plug connector.

Further, the flexible leg 34, 34' shown in FIGS. 1 and 2 may have a thinner wall thickness than the stem portion 32, 32', respectively. Thus, when flexing the flexible leg 34, 34', the stem portion 32, 32' remains substantially unflexed.

Further, the secondary locking device 30, 30' includes a pushing plate 31, 31' that provides a pushing face 31*u* for pushing the secondary locking device 30, 30' in mating direction. The stem portion 32, 32' extends from the pushing plate 31, 31', particularly from a surface 311 of the pushing plate 31, 31' that is opposite to the pushing face 31*u*.

The stem portion 32, 32' includes a flexible beam 40, 40' extending from the pushing plate 31, 31' to a distal end of the stem portion 32, 32'. The flexible beam 4*o*, 40' includes a first end and a second end wherein the first end and the second end are fixed ends. Here, the first end is connected to the pushing plate and the second end to the distal end of the stem portion 32, 32'. Further, the flexible beam 4*o*, 40' includes a beam locking protrusion 42, 42'. This beam locking protrusion is configured to engage with a corresponding beam locking protrusion 142 of the plug connector 10, when the secondary locking device is in its closed state, as exemplarily shown in FIG. 4B.

Further, the secondary locking device 30, 30' includes a blocking means 33, 33' to provide a secondary locking function. The blocking means 33, 33' may be formed at the pushing plate 31, 31' and is configured to block the flexible arm 11 of the plug connector 10 in a rest condition (cf. FIG. 6E), thereby preventing the flexible arm 11 from releasing the primary locking means, when the secondary locking device 30, 30' is in its closed position.

Additionally, the secondary locking device 30 shown in FIG. 1 or the secondary locking device 30' shown in FIG. 2 and in particular the flexible leg 34, 24' of the secondary locking device 30, 30', respectively, include an abutment means 36, 36' configured to engage with a pre-blocking means 16 (cf. FIG. 6A) for the blocking. Thus, closing the secondary locking device 30, 30' prior to having mated the plug connector can be prevented. The abutment means 36, 36' may further include an abutment face 36*a*, 36*a*', as described in greater detail with respect to FIG. 6A and a lock release face 36*r*, 36*r*' as described in greater detail with respect to FIG. 6F.

Further, the secondary locking device 30 shown in FIG. 1 as well as the secondary locking device 30' shown in FIG. 2 includes a locking means 37, 37' configured to provide a further locking function when the plug connector 10 is in the mated position with the corresponding counter connector 20. Thus, the mating between the plug connector and the counter connector can be further secured (cf. FIG. 6E).

In an aspect, the locking means 37, 37' includes a protrusion 35, 35' wherein the protrusion 35, 35' is configured to cooperate with a secondary opening (or recess) 26 in the counter connector. The protrusion may include a sloping ramp surface 35*s* for bending the flexible leg 34, 34' with a sidewall 21 of the counter connector 20. Thus, the flexible leg 34, 34' is flexed out of a rest condition (i.e., a condition wherein there is no flexing) into a flexed condition, when the secondary locking device 30, 30' is moved from its open position (cf. FIG. 6A) to its closed position (cf. FIG. 6E) along a closing direction C.

The secondary opening or recess 26 may have a sharp edge 26*t* (cf. FIG. 6E) that is configured to carve into a rearward sloping ramp surface 35*t*, 35*t*' of the protrusion 35, 35' of the locking means 37, 37' of the flexible leg. Thereby securing the secondary locking device 30, 30' is securely locked in the closed position.

Figure 6A:
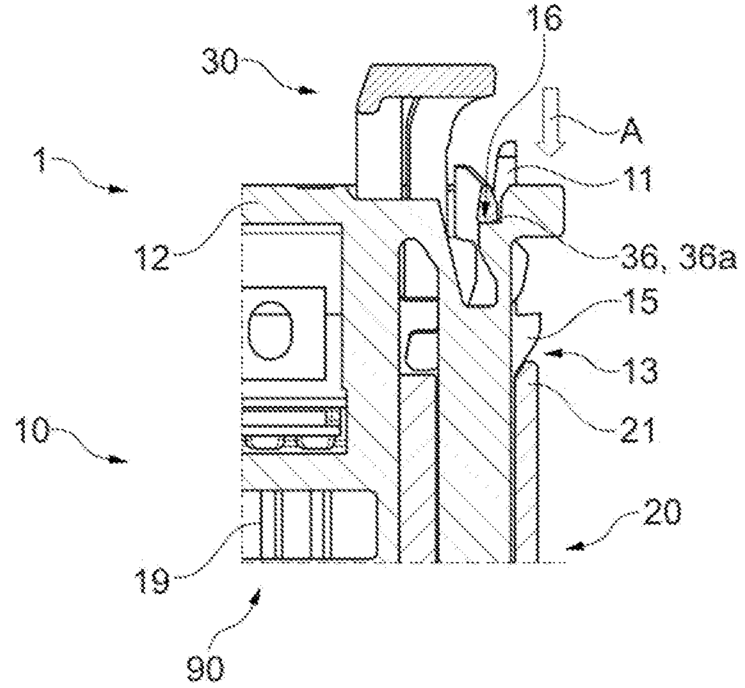
FIG. 6A shows a schematic partial cut view of a connector system and a counter connector, wherein a plug connector of the connector system in an initial position.
Figure 6B:
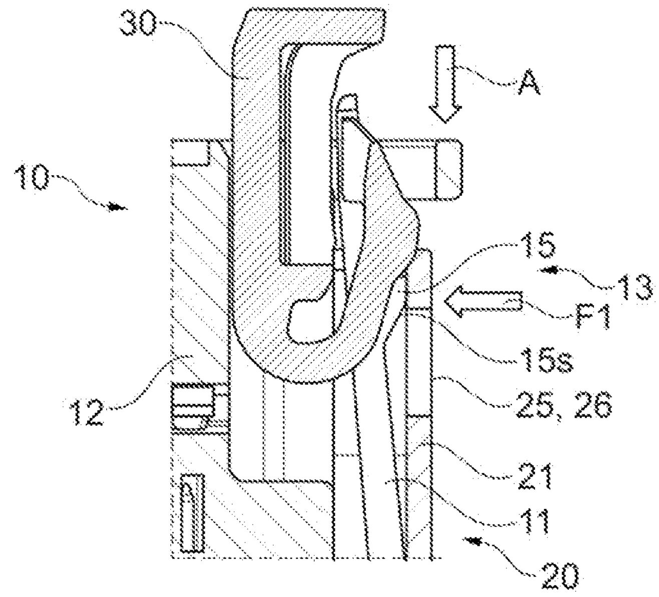
FIG. 6B shows a schematic partial cut view of the connector system shown in FIG. 6A, wherein the plug connector is moved out of the initial position.
Figure 6C:
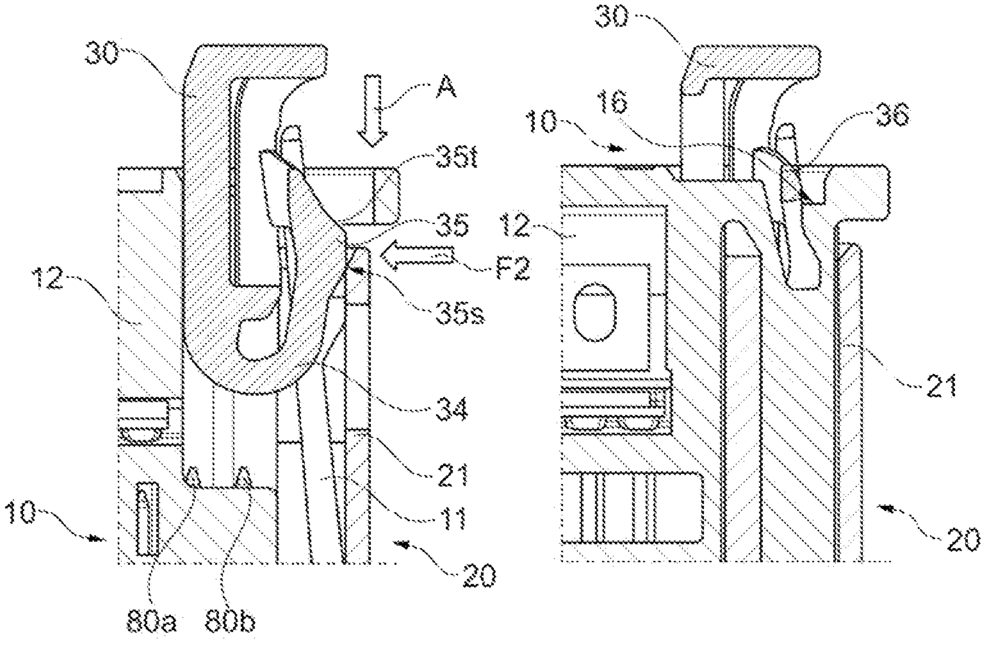
FIG. 6C shows schematic partial cut views of the connector system shown in FIGS. 6A and 6B, during moving the plug connector from its initial position to a mated end position.
Figure 6D:
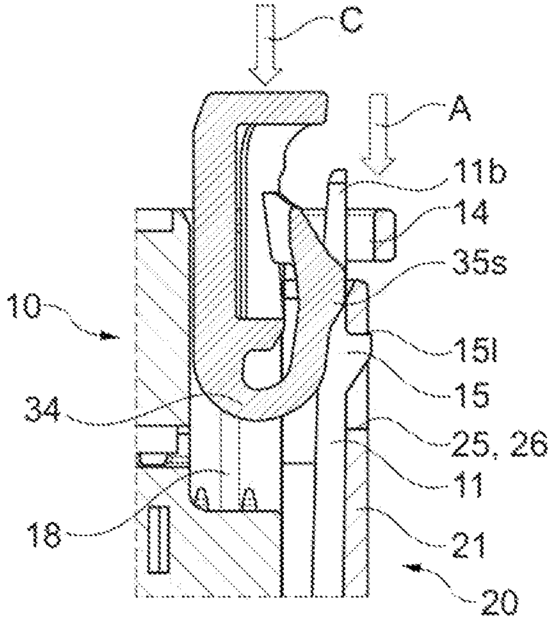
FIG. 6D shows a schematic partial cut view of the connector system shown in FIGS. 6A to 6C, wherein the plug connector is in its mated and locked end position and a secondary locking device is moved out of a pre-locked open position.

In an example shown FIG. 6D, the plug connector housing 12 may include an elongated guiding means 18 (here a guiding rib) along the mating direction A and the secondary locking device 30, 30' may include a corresponding guiding means 38, 38' (here a guiding groove) that is configured to couple with the elongated guiding means 18, so as to guide the movement of the secondary locking device 30, 30' from the open position to the closed position. Thus, a tilting and jamming of the secondary locking device 30, 30' can be prevented.

Still further, the secondary locking device 30, 30' may include an engagement means 39, 39' configured to engage with the plug connector housing 12, so as to prevent the secondary locking device 30, 30' from being decoupled from the plug connector housing 12, when the secondary locking device 30, 30' is in its open position. The engagement means 39, 39' may be provided as a protrusion that engages with a corresponding recess or groove (not shown). Thus, an unintentional loosening of the secondary locking device can be prevented.

Further, the secondary locking device 30' shown in FIG. 2 includes an anti-catch protrusion 34*b*2. The anti-catch protrusion 34*b*2 protrudes laterally from the free end 34*b*' of the flexible leg 34' towards the stem portion 32'. The lateral direction, i.e., the protruding direction of the anti-catch protrusion **34*b*2 is substantially perpendicular to a flex-direction (secondary flex direction F2) of the flexible leg 34'**.

In the embodiment shown in FIG. 2, the anti-catch protrusion **34*b*2 protrudes from a surface of the flexible leg 34' that is opposite to a surface of the flexible leg 34', where an abutment means 36' protrudes from the flexible leg 34'. With providing the anti-catch protrusion 34*b*2, a width of a gap between the free end 34*b*' of the flexible leg 34' and the stem portion 32' can be further reduced. Thus, catching and jamming of the secondary locking device 30'** with cables, further secondary locking devices and/or the like can be prevented.

The anti-catch protrusion **34*b*2 may further be sized and shaped so as to limit a movement of the flexible leg 34' in a direction towards the stem portion 32'. The allowable movement towards the stem portion 32' can be adjusted by providing a defined gap between the anti-catch protrusion 34*b*2 at the free end 34*b*' of the flexible leg 34' and the stem portion. Thus, a movement of the flexible leg 34' in a direction towards the stem portion 32' can be blocked upon abutment between the stem portion 32' and the anti-catch protrusion 34*b*2**.

Figure 3A:
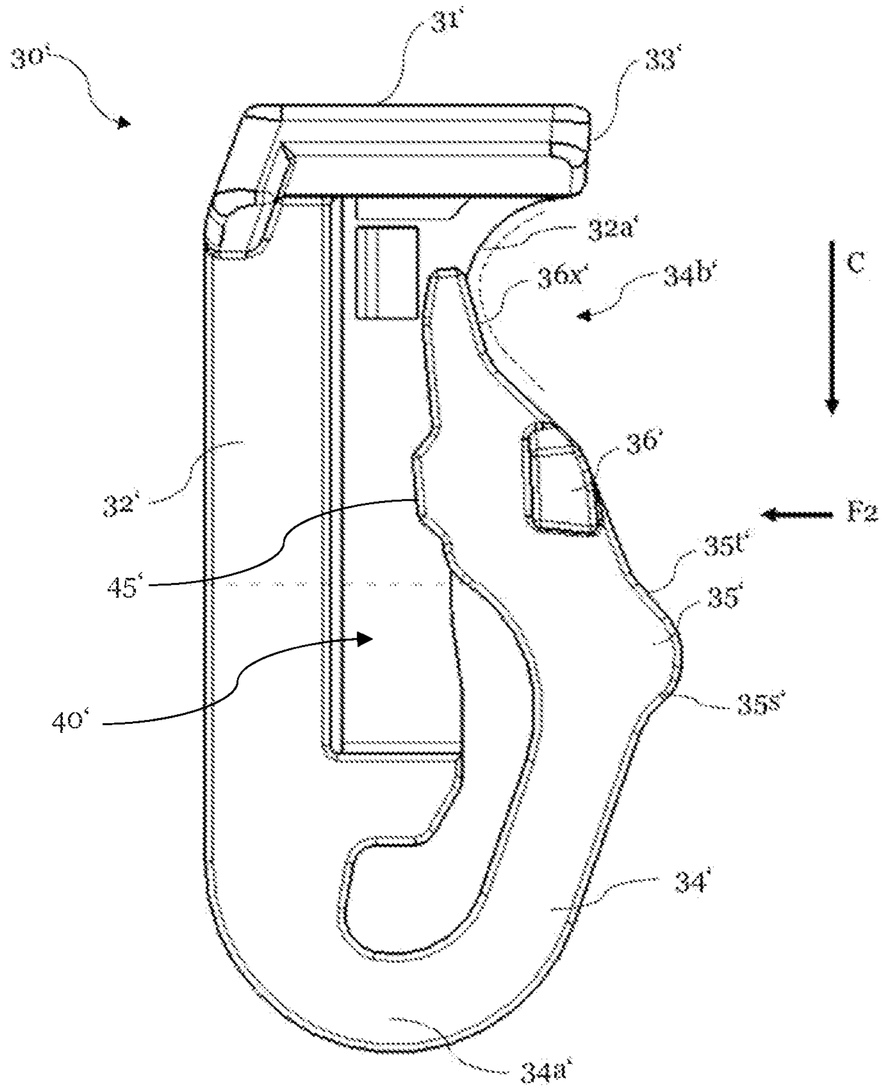
FIG. 3A shows a side view of the secondary locking device of FIG. 2.

FIG. 3A shows a side view of the secondary locking device 30' of FIG. 2. Here, the flexible leg 34' is connected to the stem portion 32' at its fixed end **34*a*' so as to from a curved shape (particularly C-shape, or U-shape). The C-shape or U-shape, prevents jamming of the secondary locking device 30', e.g. if provided as bulk goods, prior to getting assembled with a plug connector. Further, when the the flexible leg 34' of the secondary locking device 30' is in an unflexed condition (likewise flexible leg 34 of the secondary locking device 30, cf. FIG. 1), a distance between the free end 34*b*' of the flexible leg 34' and the stem portion 32' is less than the minimum wall thickness of the secondary locking device 30'**. Thus, catching and jamming of secondary locking devices can be effectively prevented.

Further, a distance between a tip of the flexible leg 34' and a lower surface of the pushing plate 31' may be chosen so that the lower surface abuts with the tip of the free end **34*b*' of the flexible leg 34', when when the secondary locking device 30' is pushed in mating direction when being in its open state. Thus, the flexible leg 34' is stabilized, when the secondary locking device 30'** is pushed in mating direction when being in its open state. This allows to provide an increased blocking force.

Further, the flexible leg 34', particularly the free end **34*b*' of the flexible leg 34', includes an anti-catch surface 36*x*', facing in a direction substantially opposite to the secondary flex direction F2. When seen from the lateral direction (as in FIG. 3A), a root portion of the stem portion 32' (here, being formed as a radius 32*a*') and the anti-catch surface 36*x*' of the flexible leg 34', particularly the free end 34*b*' of the flexible leg 34'** form a combined contour that is continuously shaped (indicated by a dashed line). Thus, a smooth geometry can be provided that prevents cable catching and/or catching of further secondary locking devices and/or the like.

Figure 3B:
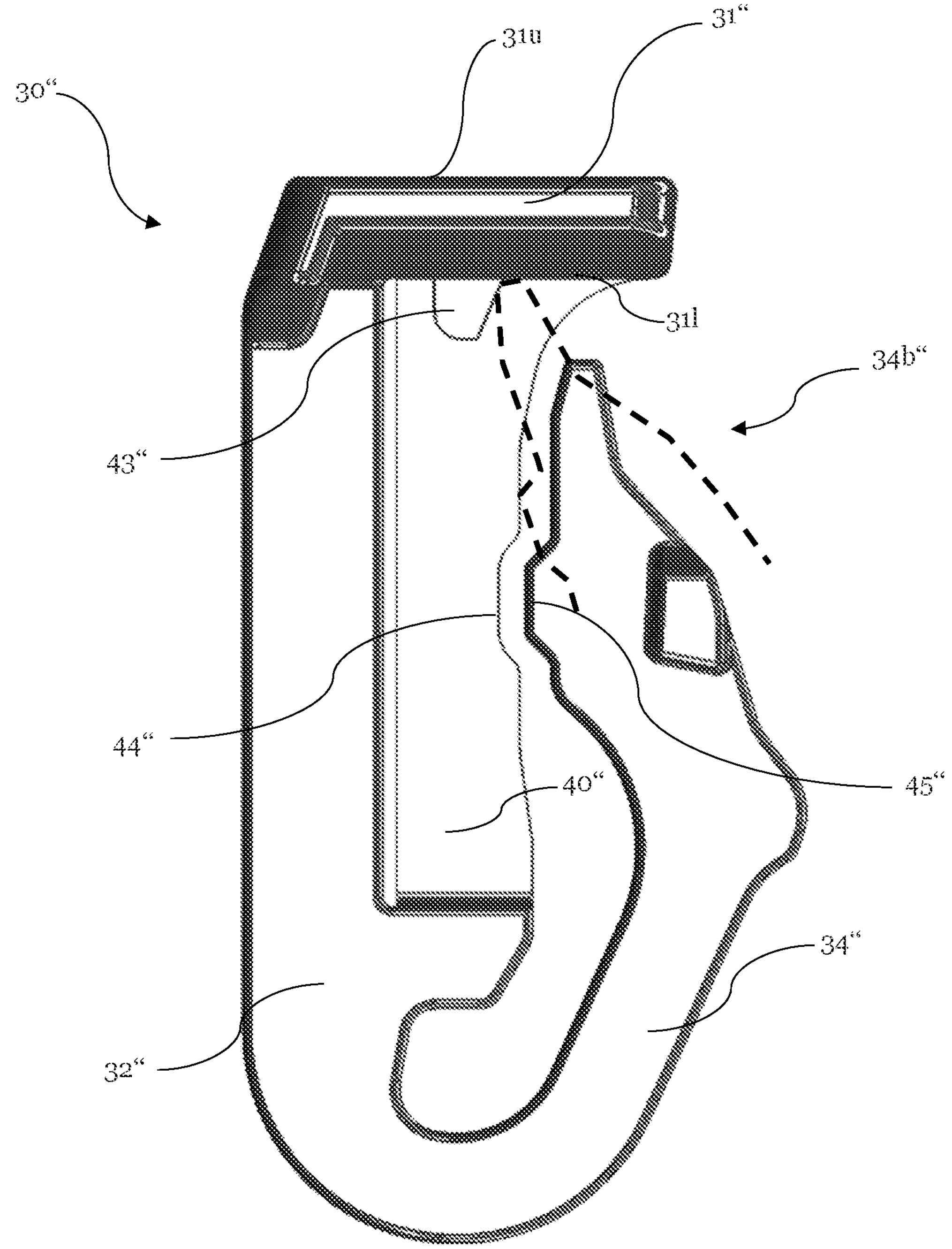
FIG. 3B shows a side view of a further secondary locking device.

As best shown in FIG. 3B, a tip abutment means 43" may protrude from the lower surface 311 of the pushing plate 31". The tip abutment means 43" may be configured to abut with a tip of the free end **34*b*" of the flexible leg 34", so as to limit a movement of the free end 34*b*" in a direction against the mating direction, when the secondary locking device is pushed in mating direction when being in its open state. Providing the tip abutment means 43" allows a further stabilization of the flexible leg 34" and hence to increase the blocking force even further. The dashed line in FIG. 3B shows the contour of the free end 34*b*", when being in contact with the tip abutment means 43"**.

Further, the stem portion 32" and in particular the flexible beam 40" may include at least one leg stabilization means 44" in form of protrusion or recess. In FIG. 3B, the leg stabilization means 44" is provided in form of a recess. The flexible leg 34" includes a corresponding leg stabilization means 45" (here a protrusion) facing the leg stabilization means 44". The leg stabilization means 44" and the corresponding leg stabilization means 45" are configured to contact each other, so as to limit a torsional movement of the flexible leg 34" that may occur during movement of the secondary locking device 30" relative to the plug connector housing.

Figure 4A:
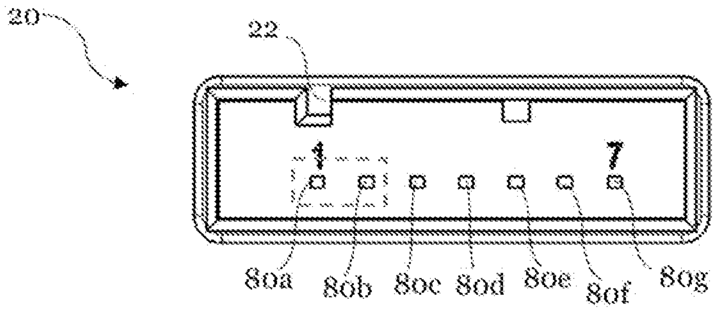
FIG. 4A shows a schematic top view of and a counter connector.
Figure 4B:
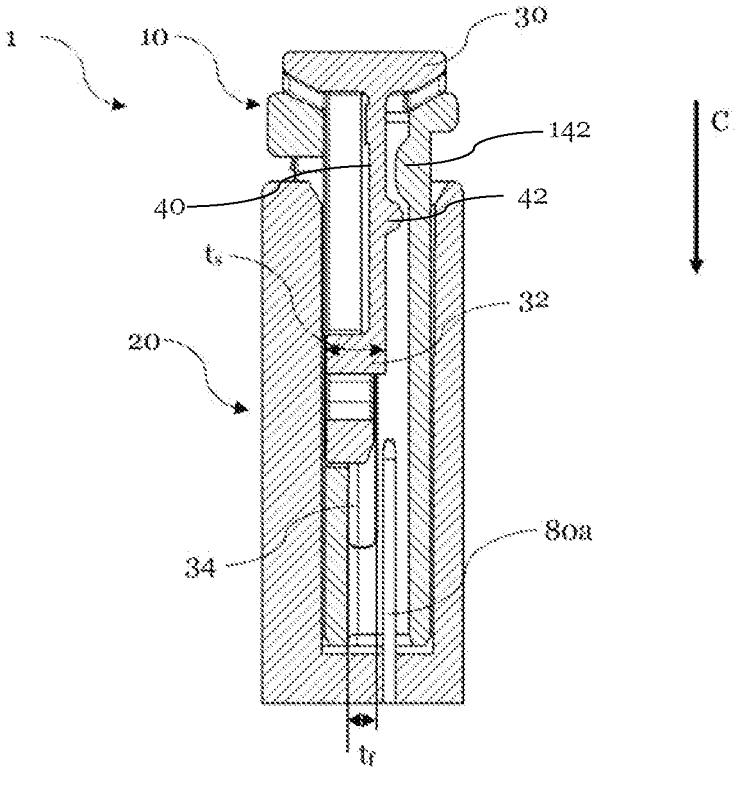
FIG. 4B shows a schematic cut view of a connector system.

FIG. 4A shows a schematic top view of and a counter connector 20. The counter connector may be standardized and includes a row of contact pins **80*a* to 80*g*. Further the counter connector includes a housing for receiving the electrical connector system 1, respectively the plug connector 10 and the secondary locking device 30, 30'. For guiding the mating of the counter connector 20 and the plug connector 10 and for ensuring a correct orientation of the plug connector 10, the counter connector may have a guiding rib 22. The dashed line encircling pins 80*a* and 80*b* gives the area that will receive the secondary locking device 30, 30' (cf. FIG. 4B). As will be described in greater detail with respect to FIG. 4B, the design of the secondary locking device 30, 30' allows to use a secondary locking device 30, 30' with this counter connector 20, without the need to remove any contact pin. FIG. 4B shows a schematic cut view of a connector system 1 being mated with a counter connector 20, as shown in FIG. 4A. The the plug connector 10 is mated with the counter connector 20 and the secondary locking device 30 is in its closed position. Thus, the plug connector 10 is securely held in the mated condition with the corresponding counter connector 20, i.e., in its mating position. Thus, unintentional loosening of the plug connector 10 and the corresponding counter connector 20** can be prevented, and a reliable electrical contact can be ensured.

As already outlined above, the wall thickness $t_f$ of the flexible leg 34 in a direction perpendicular to the closing direction C and optionally perpendicular to the secondary flex direction, is smaller than a wall thickness $t_s$ of the stem portion in the direction. This allows the flexible leg 34 to slide by a contact pin **80*a* of the corresponding counter connector 20, when the plug connector 10 is mated with the corresponding counter connector 20 and the secondary locking device 30 is in its closed position. Further, the stem portion 32 is designed, e.g., recessed, so as to cover at least partially (but not contact) the respective contact pin 80*a*, when seen from a top view. Thus, the secondary locking device 30** does not disturb or damage existing contact pins.

Figure 5A:
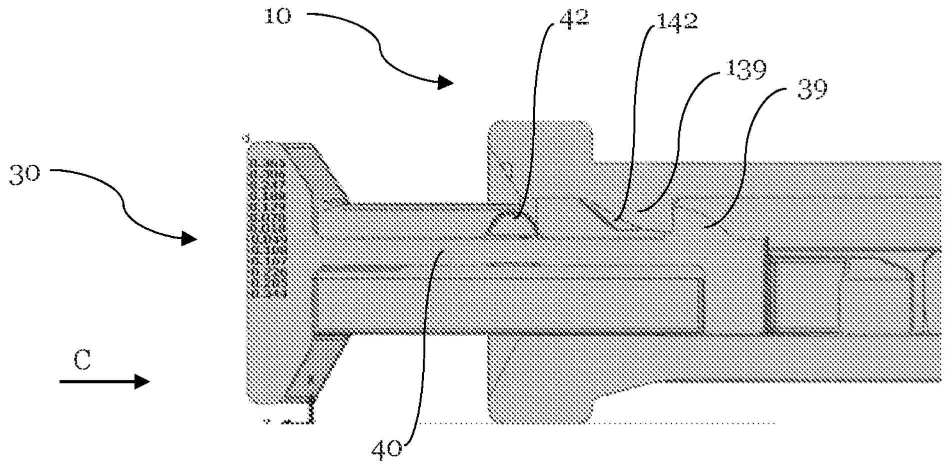
FIG. 5A shows a detailed view of the secondary locking device, when being inserted into the housing of the plug connector 10.
Figure 5B:
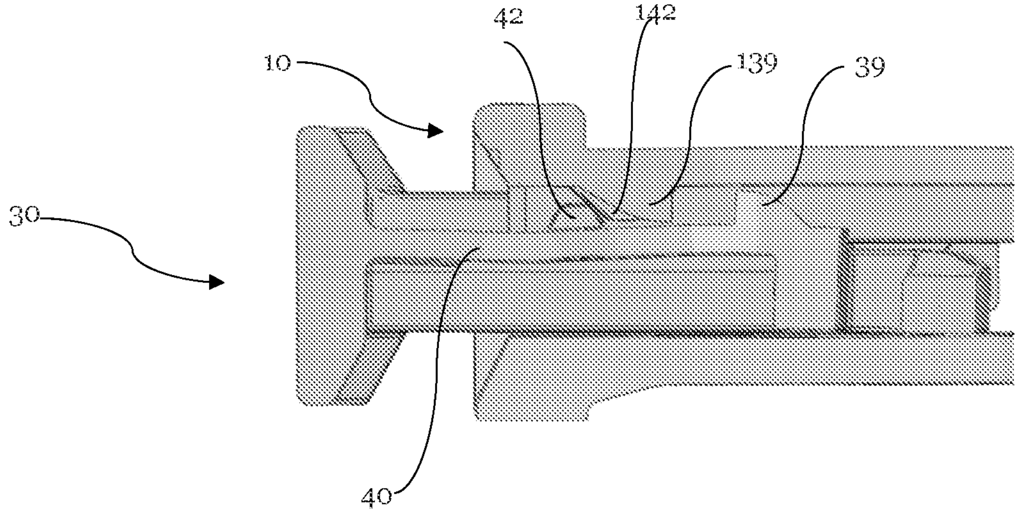
FIG. 5B shows a detailed view of the secondary locking device, when being inserted into the housing of the plug connector 10.

FIGS. 5A and 5B show a detailed view of the secondary locking device, when being inserted into the housing of the plug connector 10, wherein FIG. 5A shows an open state of the secondary locking device 30, and FIG. 5B a state, where the secondary locking device 30 is pushed, however not yet in its closed stated.

In FIG. 5A, the engagement means 39 is engaged with a corresponding engagement means 139 of the plug connector housing 10, particularly the plug connector housing. This prevents the secondary locking device 30 from being decoupled from the plug connector housing when the secondary locking device 30 is in its open position. When the secondary locking device is pushed in closing direction C, the secondary locking device is moved relative to the plug connector (cf. FIG. 5B), until the closed state is achieved (cf. FIG. 4B).

A beam locking protrusion 42 of the flexible beam 40 is configured to engage with a corresponding beam locking protrusion 142 of the plug connector when the secondary locking device is in its closed state. When being in an open state, the beam locking protrusion 42 and the corresponding beam locking protrusion 142 does not engage. Particularly, the position of the beam locking protrusion 42 on the flexible beam 40 may be chosen so as to prevent a contact between the beam locking protrusion 42 and the corresponding beam locking protrusion 142, as long as the secondary locking device is in its open position or pushed in the open position as shown in FIG. 5B. Thus, even when being (unintentionally) pushed in a mating direction in its open position, the flexible beam 40 does not deform and a proper function of the flexible beam 40 can be guaranteed, when the secondary locking device 30 is intentionally moved to the closed position.

FIGS. 6A to 6F show an electrical connector system 1 and a counter connector 20 (i.e., a connector assembly). In particular different mating steps are shown. FIG. 6A shows a schematic partial cut view of a connector system 1 and a counter connector 20, wherein a plug connector 10 of the connector system 1 in an initial position.

The plug connector 10 is configured to be mated with a corresponding counter connector 20 and includes a plug connector housing 12 having at least one terminal cavity 19, for receiving at least one electrical contact terminal 90.

In the initial position, the plug connector 10 and the secondary locking device 30 may be partially received in the counter connector 10, however, there is no locking yet. The primary locking means 13, respectively protrusion 15, that is provided at the flexible arm 11 of the plug connector housing 12 abuts the sidewall 21 of the counter connector 20.

Further, the plug connector housing 12 includes a pre-blocking means 16. The pre-blocking means 16 is configured to block the secondary locking device 30 from moving from the open to the closed position when the plug connector is in an unmated position (or initial position) as shown in FIG. 6A. It has to be noted, that the secondary locking device shown in FIGS. 6A to 6F may, for example, be the secondary locking device 30 depicted in FIG. 1 or the secondary locking device 30' depicted in FIG. 2. The flexible leg 34 of the secondary locking device 30 includes an abutment means 36 configured to engage with the pre-blocking means 16 for the blocking. In particularly, the abutment means 36 includes an abutment face 36*a* that is contacts the pre-blocking means 16 of the plug connector housing 12 for the blocking.

When the plug connector is pushed (or moved) into the mating direction, as indicated by the arrow shown in FIG. 6B, the flexible arm 11 of the plug connector housing 12 is flexed in a direction towards the secondary locking means 34 (primary flex direction F1). This is achieved as the protrusion 15 of the primary locking means 13 includes a sloping ramp surface 15*s* for bending the flexible arm 11 with a sidewall 21 of the counter connector 20. The flexible arm 11 is thus flexed out of a rest condition (i.e., a condition wherein there is no flexing) into a flexed condition, when the plug connector 10 is moved from its initial position (cf. FIG. 6A) to a mated position along a mating direction A, without the need of manually flexing the flexible arm 11. The flexible leg 34 may remain in a rest position.

In FIG. 6C, the electrical connector system 1 is shown during moving the plug connector 10 from its initial position to a mated end position. Here, the flexible arm 11 is still in the flexed condition. On the left side of FIG. 6C, the engagement between the protrusion 35 of the flexible leg 34 and the sidewall 21 of the counter connector 20 is shown. Due to the ongoing movement of the plug connector, the secondary locking device is also moved in mating direction with respect to the counter connector 20. The locking means 37 of the flexible leg 34, and in particular the respective protrusion 35, includes a sloping ramp surface 35*s* for bending the flexible leg 34 with a sidewall 21 of the counter connector 20. Thus, the flexible leg is flexed out of a rest condition (i.e., a condition wherein there is no flexing) into a flexed condition. This flexing of the flexible leg 34 releases the blocking contact between the blocking means 16 of the plug connector 10 and the abutment means 36 of the secondary locking device 30, as shown in FIG. 6C, right illustration. After being fully released, the secondary locking device 30 is free to be moved from the open position to the closed position.

In FIG. 6D, the plug connector 10 is in its mated end position and the secondary locking device 30 begins to move out of the pre-locked, open position. In the mated end position, the primary locking means 13 of the flexible arm 11 provides a primary locking function. Particularly, protrusion 15 of the primary locking means 13 cooperates with a primary opening 25 in the counter connector 20. The protrusion 15 of the primary locking means 13 includes a locking face 151 that contacts and engages a rim portion of the primary opening 25 provided in the counter connector 20 for the primary locking function.

By pushing the secondary locking device 30 in closing direction C, which points here in the same direction as the mating direction A, the secondary locking device 30 starts to move from the open position to the closed position. The locking means 37 of the flexible leg 34, and in particular the respective protrusion 36, includes a sloping ramp surface 35*s* that engages a sidewall 21 of the connector 20 and thus, the flexible leg 34 is flexed (bended) out of a rest condition (i.e. a condition wherein there is no flexing) into a flexed condition (i.e. in the secondary flex direction F2 towards the stem portion 32) when the secondary locking device is moved from its open position to its closed position along a closing direction C.

Figure 6E:
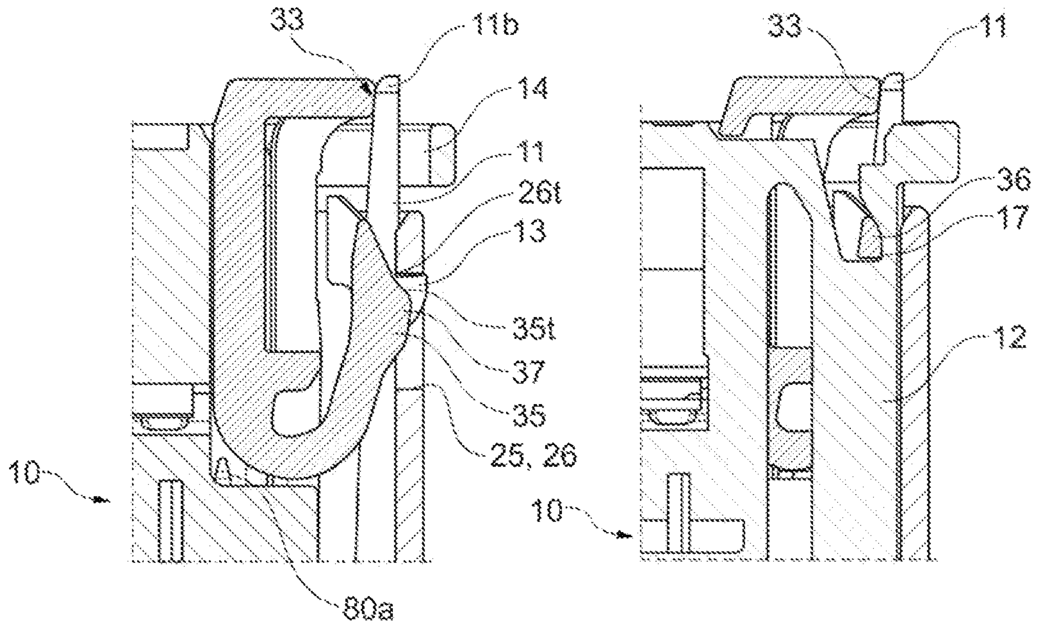
FIG. 6E shows schematic partial cut views of the connector system shown in FIGS. 6A to 6D, wherein the secondary locking device is in its closed position.

As shown in FIG. 6E (left side) when the secondary locking device 30 has reached the closed position, the flexible leg 34 is flexed back into a rest position and the locking means 37, particularly the protrusion 35 thereof, cooperates with the secondary opening 26 in the counter connector to provide the further locking function. Particularly, the secondary opening or recess 26 may have a sharp edge 26*t* that is configured to carve into a rearward sloping ramp surface 35*t* of the protrusion 35 of the locking means 37 of the flexible leg 34. Here, the primary opening 25 and the secondary opening 26 are integrally formed as one opening.

In this closed position, a blocking means 33 of the secondary locking device 30 provides a secondary locking function. The blocking means 33 blocks the flexible arm 11 of the plug connector in a rest condition, thereby preventing the flexible arm 11 from releasing the primary locking means 13. For example, the flexible arm 11 includes a free end 11*b* and the blocking means 33 is configured to engage with the free end 11*b* of the flexible arm 11. Further, the free end 11*b* of the flexible arm 11 may protrude over an end portion of the plug connector housing 12 in a direction opposite the mating direction A. Particularly, the free end of the flexible arm may protrude through a top opening 14 in the plug connector housing 12. In other words, the free end of the flexible arm may be arranged exterior to the plug connector housing. Further, the flexible arm 11 may protrude over the pushing plate 31 of the secondary locking device 30 in a direction opposite the closing direction C when the secondary locking device 30 is in its closed position. Thus, when moving the secondary locking device 30 from the open position to the closed position, the user will get tactile feedback by the protruding free end 11*b* of the flexible arm 11, when the secondary locking device 30 has reached its closed position.

As shown on the right side of FIG. 6E, when the secondary locking device 30 has reached the closed position, the abutment means 36 is received in a corresponding additional locking recess 17 provided in the plug connector housing 12. Thus, the secondary locking device 30 is securely held in the plug connector housing 12 of the plug connector 10.

Figure 6F:
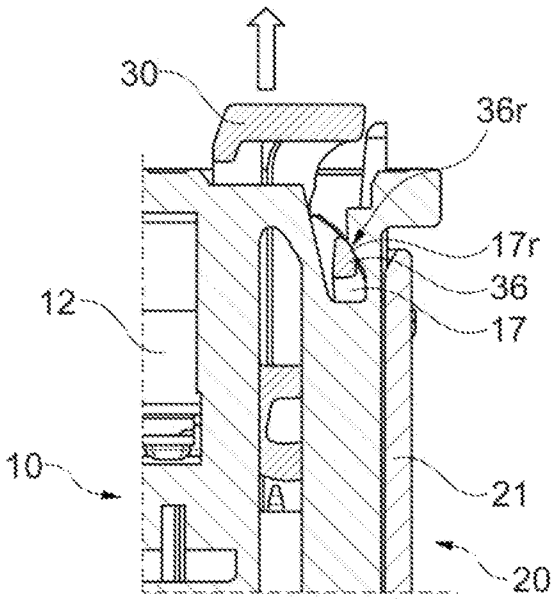
FIG. 6F shows a schematic partial cut view of the connector system shown in FIGS. 6A to 6E, wherein the secondary locking device is going to be released from the closed position.

FIG. 6F shows a schematic partial cut view of the connector system shown in FIGS. 6A to 6E, wherein the secondary locking device 30 is released from the closed position. When the secondary locking device 30 is moved opposite to the closing direction C, a lock release face 36*r* of the abutment means 36 may engage with a corresponding lock release face 17*r* provided on the plug connector housing 12, so as to release the further locking function. Due to the engagement of the lock release face 36*r* of the abutment means 36 and the corresponding lock release face 17*r*, the flexible leg 34 is flexed in the secondary flex direction and the further locking function between the the locking means 37, particularly the protrusion 35 thereof, and the secondary opening (or recess) 26 is released. Particularly, if the secondary opening or recess 26 has a sharp edge 26*t*, providing a lock release face 36*r* allows unplugging the connector system, without jamming or even destroying the secondary locking device.

In the embodiment shown in FIG. 6F, the corresponding lock release face 17*r* is provided in additional locking recess 17 provided in the plug connector housing 12. After having moved the secondary locking device back into the open position, the plug connector 10 is ready for being unmated, after having released the primary locking.

The invention claimed is:

1. An electrical connector system, comprising:

a plug connector and a secondary locking device, wherein the plug connector is configured to be mated with a corresponding counter connector and includes a plug connector housing having at least one terminal cavity, for receiving at least one electrical contact terminal, and wherein the secondary locking device is configured to provide a secondary locking function when the plug connector is mated with the corresponding counter connector and when the secondary locking device is in a closed position, wherein the secondary locking device is arranged movable relative to the plug connector housing to be moveable from an open position to the closed position along a closing direction, the secondary locking device having a stem portion and at least one flexible leg, wherein the stem portion extends substantially in the closing direction, wherein the flexible leg has a fixed end and a free end, wherein the flexible leg is connected to the stem portion at the fixed end, wherein the flexible leg extends from the fixed end to the free end in a direction against the closing direction, wherein the locking device comprises a protrusion, wherein said protrusion is configured to cooperate with a secondary opening in the counter connector.

2. The electrical connector system according to claim 1, wherein the protrusion comprises a sloping ramp surface for bending the flexible leg with a sidewall of the counter connector.

3. The electrical connector system according to claim 1, wherein the plug connector housing comprises a pre-blocking device configured to block the secondary locking device from moving from the open to the closed position when the plug connector is in an unmated position with the counter connector and wherein the flexible leg of the secondary locking device comprises an abutment device configured to engage with the pre-blocking device for said blocking.

4. The electrical connector system according to claim 3, wherein the flexible leg is configured to flex in a secondary flex direction towards the stem portion, and wherein the abutment device protrudes from the flexible leg in a direction substantially perpendicular to the secondary flex direction.

5. The electrical connector system according to claim 4, wherein the abutment device is received in a corresponding additional locking recess provided in the plug connector housing, when the secondary locking device is in the closed position, so as to secure the secondary locking device in the closed position.

6. The electrical connector system according to claim 4, wherein the abutment device includes an abutment face that is configured to contact the pre-blocking device of the plug connector housing for said blocking and wherein the abutment device further comprises a lock release face that is configured to engage with a corresponding lock release face provided on the plug connector housing, when the secondary locking device is moved from the closed position to the open position, so as to release a further locking function.

7. The electrical connector system according to claim 1, wherein the plug connector housing comprises an elongated guiding device along the mating direction and wherein the secondary locking device comprises a corresponding guiding device that is configured to couple with the elongated guiding device, so as to guide movement of the secondary locking device from the open position to the closed position.

8. The electrical connector system according to claim 1, wherein when the secondary locking device comprises an engagement device, configured to engage with the plug connector housing, so as to prevent the secondary locking device from being decoupled from the plug connector housing, when the secondary locking device is in the open position.

9. A method for mating an electrical connector system with a counter connector, the counter connector configured to receive a plug connector and a secondary locking device of the electrical connector system at least partly, the method comprising:

providing an electrical connector system including a plug connector and a secondary locking device, wherein the plug connector is configured to be mated with a corresponding counter connector and includes a plug connector housing having at least one terminal cavity, for receiving at least one electrical contact terminal, and wherein the secondary locking device is configured to provide a secondary locking function when the plug connector is mated with the corresponding counter connector and when the secondary locking device is in a closed position, wherein the secondary locking device is arranged movable relative to the plug connector housing to be moveable from an open position to the closed position along a closing direction, the secondary locking device having a stem portion and at least one flexible leg, wherein the stem portion extends substantially in the closing direction, wherein the flexible leg has a fixed end and a free end, wherein the flexible leg is connected to the stem portion at the fixed end, wherein the flexible leg extends from the fixed end to the free end in a direction against the closing direction, wherein the locking device comprises a protrusion, wherein said protrusion is configured to cooperate with a secondary opening in the counter connector;

providing a counter connector, mating the plug connector of the electrical connector system with the counter connector by moving the plug connector from an initial position to the mated position, and moving the secondary locking device of the electrical connector system from an open position to the closed position.

* * * * *